MOLD LUBRICATING MEANS FOR GLASSWARE MAKING MACHINES
Filed Dec. 27, 1967 4 Sheets-Sheet 1
FIG 1
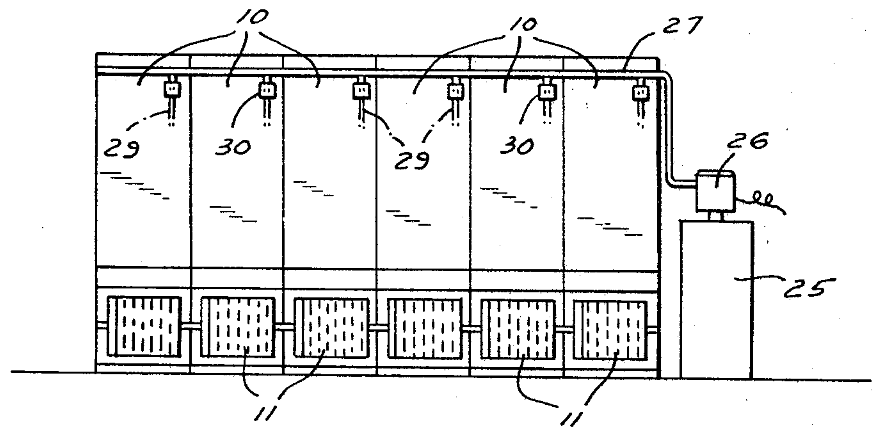
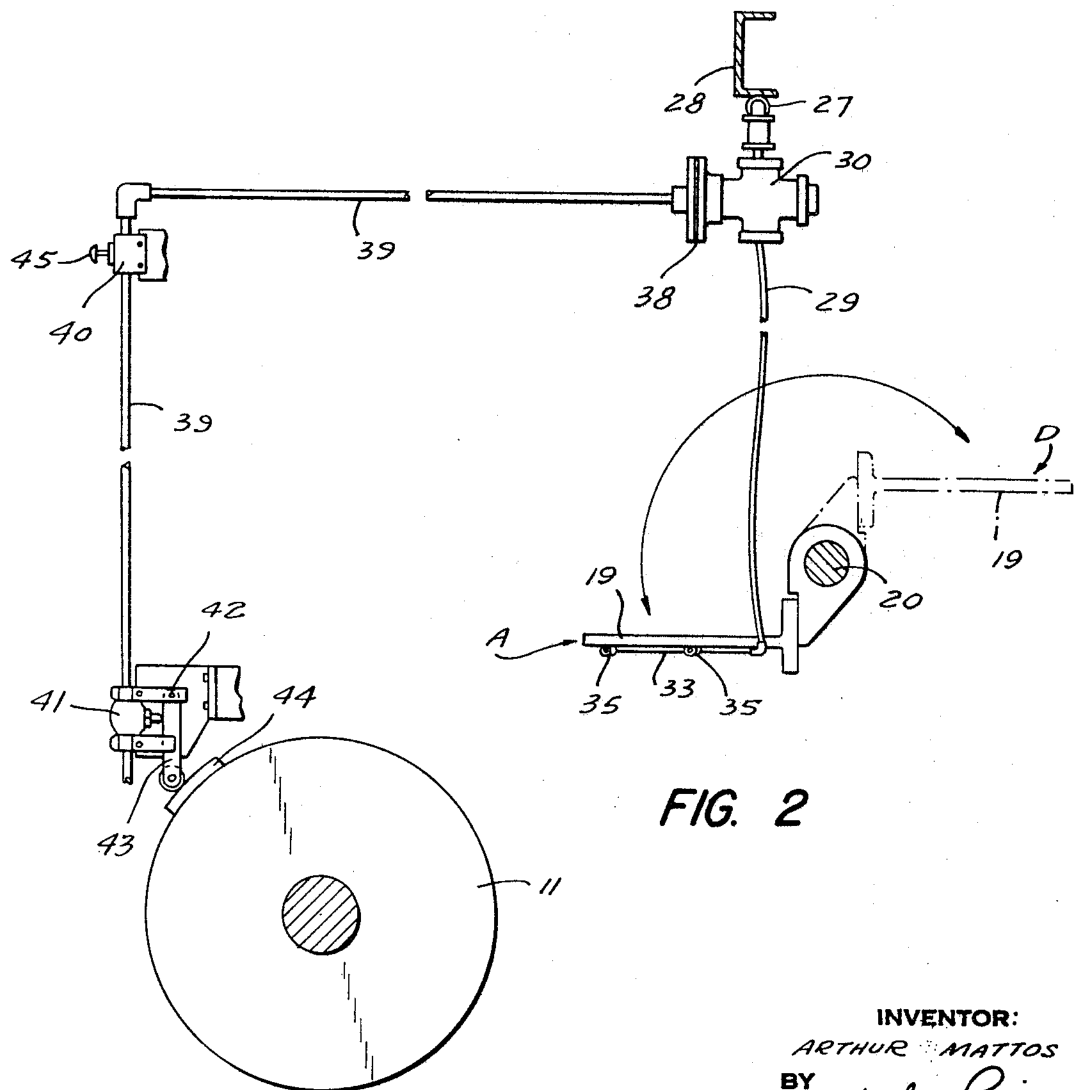
FIG. 2
INVENTOR:
ARTHUR MATTOS
BY
Breitenfeld & Levine
ATTORNEYS

MOLD LUBRICATING MEANS FOR GLASSWARE MAKING MACHINES

Filed Dec. 27, 1967 4 Sheets-Sheet 2

INVENTOR:
ARTHUR MATTOS
BY
Breitenfeld & Levine
ATTORNEYS

MOLD LUBRICATING MEANS FOR GLASSWARE MAKING MACHINES

INVENTOR:
ARTHUR MATTOS
BY
Breitenfeld & Levine
ATTORNEYS

FIG. 5
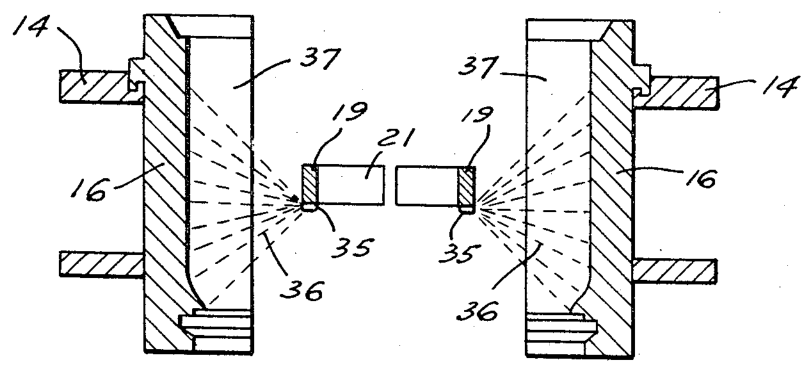
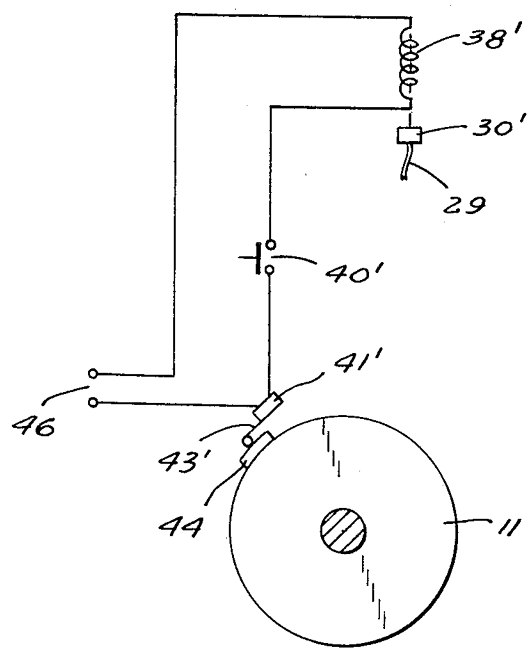
FIG. 6
INVENTOR:
ARTHUR MATTOS
BY
Breitenfeld & Levine
ATTORNEYS United States Patent Office 3,523,016

Patented Aug. 4, 1970

1

3,523,016

MOLD LUBRICATING MEANS FOR GLASSWARE MAKING MACHINES

Arthur Mattos, Woodbridge, N.J., assignor to Production Specialties Company, a corporation of New Jersey Filed Dec. 27, 1967, Ser. No. 693,992

Int. Cl. C03b 39/00

U.S. Cl. 65—170 8 Claims

ABSTRACT OF THE DISCLOSURE

For machine having blank and blow molds and member for transferring parison from blank to blow mold, transfer member moving between separated sections of blank mold: nozzle carried by transfer member for directing airless spray of lubricant substantially laterally from the transfer member on interior blank mold surfaces as transfer member moves. Spray may be effected only when transfer member is between mold sections. Control of spray may be electrical or pneumatic.

This invention relates to machines for making glassware, especially glass containers, and more particularly to lubrication of the molds of such machines, especially the "blank" molds.

In the following description and the accompanying drawings, it is assumed that the invention is incorporated in a machine of the type known as an I.S. Glass-Forming Machine made by the Hartford-Empire Co. Division of Emhart Manufacturing Company. However, it is to be understood that the invention may be employed with any machine having certain similar characteristics.

In these machines, an article is formed by a two stage process involving first the formation of a blank or parison (i.e., a partially formed article) from a gob of molten glass, and then the formation of the finished article from the parison. For this purpose, two separate molds are furnished, namely, a blank mold in which the parison is formed, and a blow mold in which the finished article is formed. In addition, means are provided for transferring the parison from the blank mold to the blow mold.

It is believed that a brief description of the glassware making equipment and procedure will aid in understanding this invention. Each mold is split along a vertical center line so that two mold sections when held together define a single cavity. Each mold section depends from a hanger arm, the two hanger arms being movable toward and away from each other to close and open the mold. Prior to the start of each molding cycle, a two-part ring arm is located beneath the blank mold, the ring arm carrying a split neck ring. The neck ring fits into the lower end of the blank mold and actually serves as the lower end of the mold, in which the neck or mouth of the container is formed (the parison is upside down when formed and is inverted as it is transferred to the blow mold). While the blank mold is held closed, a gob of molten glass is delivered to it through a funnel held against its upper end, and compressed air is then blown into the funnel to settle the gob against the lower, neck ring end of the mold. The upper end of the mold is then closed, and in a so-called counter blow air is directed through the neck ring to hollow out the gob and cause it to fill the mold. In the alternative, this hollowing and mold-filling step may be performed by pressing rather than blowing.

The hanger arms are then separated to open the mold and release the parison, but the ring arm parts and hence the neck ring remain closed and thus grasp the parison by its neck. The ring arm then swings through about 180° in a vertical plane, first upwardly between the blank mold sections and then downwardly to bring the parison between the separated blow mold sections. The blow mold

2 closes around the parison, the ring arm parts separate to release the parison, the parison is reheated, and air is blown into the parison through its neck to cause the latter to fill out to the shape of the blow mold. In the meantime, the ring arm closes and swings back through the separated blank mold sections to its original position, and the blank mold closes once again.

The interior surfaces of both molds must be lubricated at regular intervals, so that the glass slides easily along these surfaces as it is blown, and is readily released from the mold. However, the blank mold must be lubricated more frequently than the blow mold. Consequently, the present invention is primarily concerned with the lubrication of blank molds.

A typical lubricant comprises graphite in a petroleum carrier, but aqueous lubricating compounds are also used. It is common practice to manually apply the lubricant to the molds by means of a swab, swabbing of the blank molds being required on the order of about every ten to fifteen minutes. Manual swabbing engenders a number of problems. The operator must work quickly while the blank mold is open and before the ring arm moves between blank mold sections on its return swing. This necessity for speed leads to non-uniform lubrication of the mold surfaces, and involves an element of danger to the operator. In addition, the swab can get caught in the molds and possibly damage them.

Clearly, therefore, an automatic arrangement for mold lubrication is highly desirable, and such arrangements have been suggested, but none are without serious fault. An automatic swabbing mechanism is known which is both complicated and expensive. Devices for spraying lubricant on the interior mold surfaces are known, but those which remain above the mold and spray downwardly into it cannot achieve uniform coating of the mold, and those which move downwardly into the mold involve complicated mechanisms. Furthermore, these spray devices operate to deliver the lubricant to the mold in a stream of air, and as a result they generally do not lubricate sufficiently.

It is an object of the present invention to overcome these problems by providing a semiautomatic and extremely simple means for spraying the interior surfaces of a blank mold.

It is another object of the invention to employ the normal movements of the machine parts to bring the spray to every portion of the mold surface.

It is a further object of the invention to provide such an arrangement which lengthens the intervals between required mold lubrications.

To accomplish these objectives according to this invention, spray means such as nozzles are mounted on the ring arm so that they move with the arm as it sweeps between its extreme positions. A suitable conduit, at least partially flexible, conducts lubricant from a reservoir to the nozzles. The lubricant is preferably pumped through the conduit, or pressurized in some other way, so that the spray from the nozzles is "airless." Flow of lubricant through the conduit is controlled by the cooperation of a manually operable device and a machine operable device, so that the arrangement is conditioned to spray only at a point in each machine cycle when the ring arm is between the blank mold sections. However, the choice of which machine cycle shall include a lubrication of the mold rests with the operator. Control of the lubricant flow may be accomplished pneumatically or electrically.

Additional features and advantages of the invention will be apparent from the following description in which reference is made to the accompanying drawings.

In the drawings:

FIG. 1 is a schematic end elevational view of a bank of glassware making machines;

FIG. 2 is a schematic view illustrating the lubricating means and a pneumatic control circuit according to this invention;

FIG. 5 is a vertical cross-sectional view along line 5—5 of FIG. 4; and

FIG. 6 is a schematic electrical control circuit for the lubricating means.

FIG. 1 illustrates a typical factory installation of glassware making machines, six such machines 10 being shown in side-by-side relation. Each machine 10 of the assembly operates independently, although its operations are usually synchronized with those of the other machines, and produces one or two glass containers during each machine cycle depending upon whether the machine is furnished with one or two molds of each type, i.e., blank molds and blow molds. If the machine has one mold of each type it is referred to as a "single gob" machine, and if it has two molds of each type it is referred to as a "double gob" machine. Each machine includes a timing drum 11, rotating continuously while the machine is in operation, provided with a series of parallel peripheral channels within which projecting knobs may be adjustably positioned. As each drum 11 rotates, it serves to initiate the various machine operations in timed relation to each other.

In FIGS. 2–6, portions of only a single machine 10 are illustrated since all the machines are identical. It is to be understood, however, that each machine is provided with the lubricating means to be described. It should also be mentioned that only a small portion of one machine is illustrated in these figures, the remainder of the machine being completely conventional.

Figure 3:
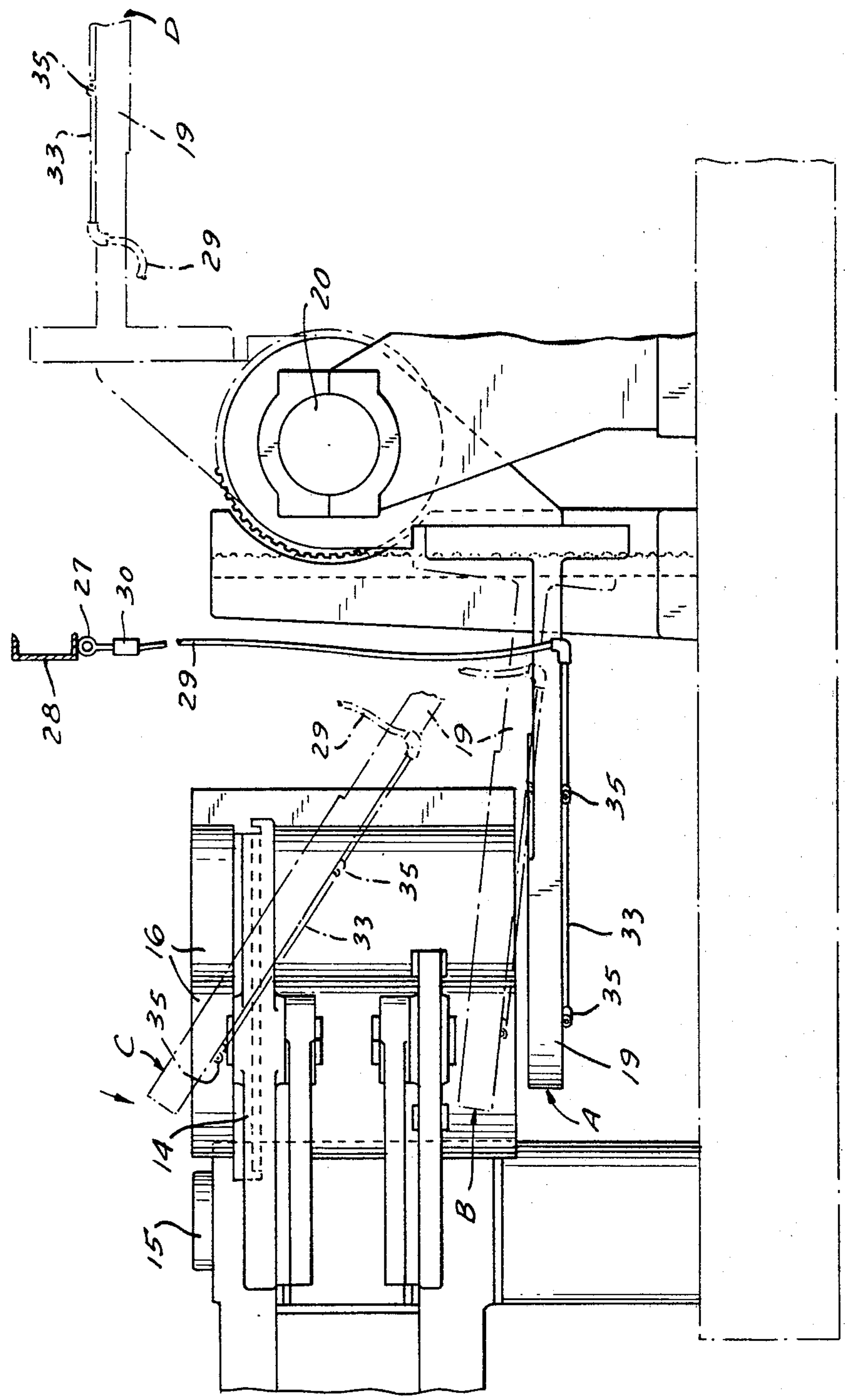
FIG. 3 is a fragmentary side elevational view of a machine incorporating the present invention.
Figure 4:
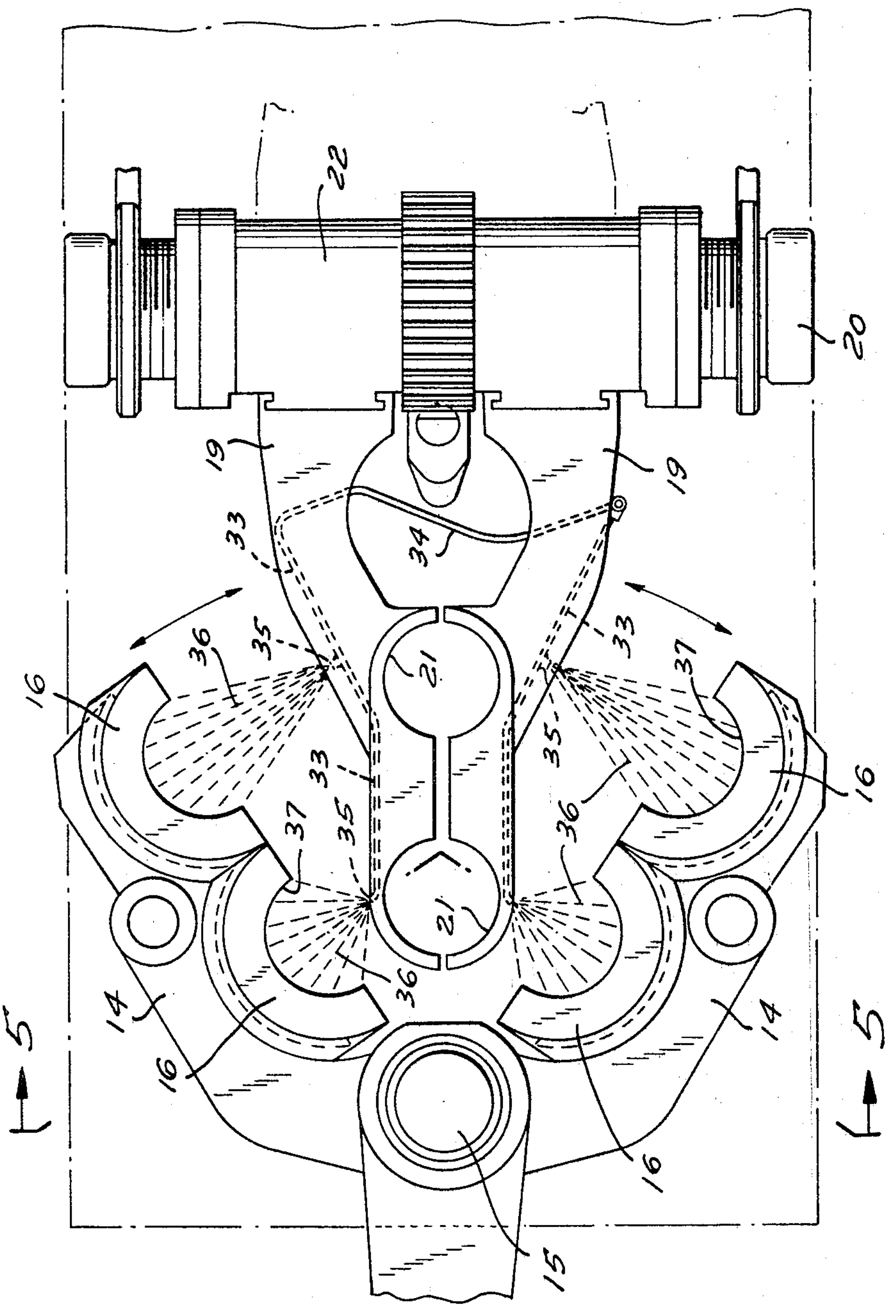
FIG. 4 is a plan view of FIG. 3.

Referring to FIGS. 2–5, the machine includes a pair of hanger arms 14, each pivotally mounted at one of its ends about a vertical pivot 15 so that the arms swing open and closed, as indicated by the arrows in FIG. 4, in jaw-like fashion. The machine illustrated is a double gob machine and hence the hanger arms 14 carry two blank molds, a one half section 16 of each blank mold carried by each hanger 14. In the drawings, the hanger arms 14 are shown separated and the molds are open. When the hanger arms are swung together, the respective mold sections 16 are pressed together, and thus closed, whereby they define two blank mold cavities.

The two parts 19 forming the neck ring arm are pivotally mounted about a horizontal pivot 20. The neck rings have been omitted in the drawings, for the sake of clarity, but it will be obvious that the neck rings are ordinarily disposed within the two circular openings 21 (FIGS. 4 and 5) between the ring arm parts 19. The ring arm parts 19 are shown in closed relationship in FIGS. 4 and 5, but the collars 22 on which they are mounted are movable toward and away from each other along the pivot axis.

The movements of the hanger arms 14 and ring arm 19 are controlled by the timing drum 11 of the machine. Just prior to introduction of a gob of glass into each blank mold, and during formation of the parisons, the blank mold sections 16 are held closed, and the ring arm 19 is below the blank molds in the full line position marked A in FIG. 3. After formation of the parison (not shown), the hanger arms 14 swing to the position shown in FIG. 4, opening the molds. The ring arm 19, while grasping the parisons by their necks, then swings upwardly between the open blank mold sections 16 through the positions marked B and C and finally reaches its other extreme position marked D. In this position, the parisons have been inverted, and the blow molds close around them. The ring arm parts 19 then separate to release the parisons, and the ring arm returns along the same path to position A. Thereafter, the hanger arms swing together to close the mold sections 16.

This movement of the blank molds and ring arm are standard on machines of the type described, and according to this invention these standard movements are utilized for mold lubrication purposes. This invention provides a reservoir 25 (FIG. 1) filled with a suitable lubricating compound, and means such as a pump 26 for supplying lubricant, under pressure, from the reservoir 25 to a manifold pipe 27 (see also FIGS. 2 and 3) extending across all the machines 10 of the assembly and mounted on a portion 28 of each machine frame. A branch conduit 29 leads from the manifold to each machine, and associated with each branch conduit is a lubricant flow regulator valve 30.

At least part of the branch conduit 29 is of flexible material, and the conduit is connected at its lower end to a pair of tubes 33 mounted on the face of the ring arm 19 which is lower when the ring arm is beneath the blank molds. The flexible nature of the conduit 29 permits the ring arm to swing between its two extreme positions without disconnecting the conduit 29. The portion 34 (FIG. 4) of one tube 33 is also flexible to permit relative movement between the ring arm parts 19. Each tube 33 is provided with two nozzles 35 along its length, the nozzles being accurately positioned so that when the ring arm is between the mold sections 16 and the regulator valve 30 is opened, an airless spray 36 of lubricant will be directed substantially laterally towards the interior surfaces 37 of the mold sections (FIG. 5).

The regulator valve 30 may be controlled in a number of ways so that it is opened only when lubrication is desired. In FIG. 2 the valve 30 is a conventional pneumatically operated type having a diaphragm 38 which when subjected to air pressure opens the valve, the valve having a spring (not shown) for closing the valve when the pressure on the diaphragm is relieved. Compressed air for operating the valve flows to it from a source (not shown) through a conduit 39. Located in the conduit 39 are a manually operable valve 40 and a machine operated valve 41, both of conventional type and normally closed to prevent flow through the conduit 39. The valve 41 has a follower 43, pivoted at 42, located in the path of travel of a projection 44 carried by the machine timing drum. During the portion of each machine cycle that the projection 44 engages the follower 43, the valve 41 is open, and this period corresponds generally to the interval during which the ring arm 19 moves from position C to position B, in FIG. 3, while it is returning to position A from position D. Thus, valve 41 will permit air to flow to the diaphragm 38, and hence permit the valve 30 to be opened and lubricant to be sprayed from nozzles 35, only while the ring arm 19 is between the separated blank mold sections 16.

However, before air may flow to the diaphragm 38, the machine operator must press the button 45 of valve 40 to open the valve. In practice, therefore, when the operator decides that the mold surfaces 37 require lubrication, he presses button 45 and keeps it depressed until, and throughout, the time that valve 41 is opened by the cooperation of follower 43 and projection 44. The button 45 is then reelased.

An alternative arrangement for controlling the flow of lubricant to the nozzles 35 is shown in FIG. 6 in which a valve 30′ operated by a solenoid 38′ is used in place of the pneumatically operated valve 30. The solenoid 38′ may be energized, to open the valve 30′, from an electrical power source 46 via an electrical circuit including a machine operated switch 41′ and a manually operable switch 40′ connected in series with the solenoid. Operation of this arrangement is comparable to operation of the arrangement shown in FIG. 2, and for this reason elements shown in FIG. 6 corresponding to elements in FIG. 2 have been given the same reference numerals as their corresponding elements but followed by a prime. It will be appreciated that the switch 41' is closed, by operation of the timing drum 11, only during the interval when the ring arm 19 moves from position C to position B, and that the molds may be lubricated during any such interval by manually closing switch 40' to energize the solenoid 38'.

It will be appreciated that the present invention provides a simple arrangement adapted to be readily incorporated in existing glassware making machines, and capable of producing a lubricant spray, at the interior faces of blank molds, which moves generally longitudinally with respect to the molds and thereby effects a uniform coating of lubrication on these mold surfaces. It has been found that by use of an airless spray according to the invention, the intervals between successive lubrications can be increased from the ten to fifteen minute swabbing intervals to thirty to forty-five minute spraying intervals. Furthermore, it may be mentioned that although the spraying has been described as taking place during movement of the ring arm 19 from position C to position B, the spray could be effected during movement of the ring arm from position B to position C, or even during both intervals.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. In a machine for making glassware including a blank mold and a blow mold spaced from the blank mold, each of said molds being formed of separable sections, means for separating said blank mold sections periodically to expose their interior surfaces, and means for transferring a parison from the blank mold to the blow mold, said transfer means passing between said separated blank mold sections, the improvement comprising:

means carried by and movable with said transfer means for spraying lubricant substantially laterally from said transfer means on the interior surfaces of the blank mold while said transfer means moves between said blank mold sections without interrupting the movement or operation of any part of the machine.

2. In a machine for making glassware, the arrangement defined in claim 1, including a reservoir for the lubricant, means for conducting the lubricant to said spray means, and means for pressurizing the conducted lubricant, whereby the lubricant is delivered as an airless spray.

3. In a machine for making glassware, the arrangement defined in claim 1, including a reservoir for the lubricant, conduit means for conducting the lubricant to said spray means, means associated with said conduit for controlling the flow of lubricant through it, and manually operable means and machine operable means cooperating to control said flow control means, said machine operable means being operated in timed relation with the movement of the transfer means, whereby the blank mold may be lubricated at the will of the machine operator but only during a predetermined portion of the machine cycle.

4. In a machine for making glassware, the arrangement defined in claim 3 wherein said flow control means is a solenoid operated valve, and said manually operable means and said machine operable means are electrical switches connected in series with said solenoid across a power source.

5. In a machine for making glassware, the arrangement defined in claim 3 wherein said flow control means is a valve having a pneumatic operator and said manually operable means and said machine operable means are valves arranged in series along a conduit connecting a supply of air under pressure to said valve operator.

6. In a machine for making glassware, the arrangement defined in claim 1 wherein the transfer means includes an arm located below the blank mold during formation of the parison.

7. In a machine for making glassware, the arrangement defined in claim 6 including means for permitting flow of lubricant from said spray means only during intervals that the transfer arm is between the separated blank mold sections.

8. In a machine for making glassware, the arrangement defined in claim 7 including means controlling said flow-permitting means to permit flow only during the return movement of the transfer arm from the blow mold to the blank mold.

References Cited

UNITED STATES PATENTS

| | | | |
|---|---|---|---|
| 3,011,213 | 12/1961 | Brandon. | |
| 3,141,752 | 7/1964 | Keller | 65—169 |

S. LEON BASHORE, Primary Examiner

E. R. FREEDMAN, Assistant Examiner

U.S. Cl. X.R.

18—20; 65—24, 26, 27, 168, 169; 118—317, 323